United States Patent

Moriya et al.

[11] Patent Number: 5,278,214
[45] Date of Patent: Jan. 11, 1994

[54] POLYOLEFIN RESIN COMPOSITION

[75] Inventors: Satoru Moriya, Ohtake; Akio Ishimoto, Yamaguchi; Mamoru Takahashi, Iwakuni, all of Japan

[73] Assignee: Mitsui Petrochemical Industries, Ltd., Tokyo, Japan

[21] Appl. No.: 809,535

[22] PCT Filed: Jun. 5, 1991

[86] PCT No.: PCT/JP91/00756
§ 371 Date: Jan. 29, 1992
§ 102(e) Date: Jan. 29, 1992

[87] PCT Pub. No.: WO91/18948
PCT Pub. Date: Dec. 12, 1991

[30] Foreign Application Priority Data
Jun. 6, 1990 [JP] Japan .................. 2-148169

[51] Int. Cl.$^5$ .............................. C08K 5/29
[52] U.S. Cl. ........................ 524/238; 525/66; 525/178; 525/179; 525/180; 525/184
[58] Field of Search ............ 524/238; 525/66, 178, 525/179, 180, 184

[56] References Cited

U.S. PATENT DOCUMENTS 4,918,133  4/1990  Moriya et al. .................. 525/97
5,179,171  1/1993  Minami et al. .................. 525/288

FOREIGN PATENT DOCUMENTS 0156464  10/1985  European Pat. Off. .
0203799  12/1986  European Pat. Off. .
0458365  11/1991  European Pat. Off. .
115912   11/1984  Japan .
120816   11/1984  Japan .
236829   11/1984  Japan .
252407    4/1986  Japan .
18948    12/1991  PCT Int'l Appl. .

Primary Examiner—Joseph L. Schofer
Assistant Examiner—Peter D. Mulcahy
Attorney, Agent, or Firm—Sherman and Shalloway

[57] ABSTRACT

The present invention discloses a polyolefin resin composition comprising a specific cycloolefin-based polymer (a), a graft-modified elastomer (b) and a compound (c) having one amino group in the molecule, and containing, based on the total amount of the components (a), (b) and (c), 50 to 95% by weight of the component (a), 1 to 50% by weight of the component (b) and 0.01 to 45% by weight of the component (c). This polyolefin resin composition is improved particularly in mechanical properties such as impact strength, etc., while retaining excellent properties of the cycloolefin-based polymer (a).

12 Claims, No Drawings

POLYOLEFIN RESIN COMPOSITION

TECHNICAL FIELD

The present invention relates to a polyolefin resin composition. More specifically, it relates to a polyolefin resin composition comprising a cycloolefin-based polymer (a), a graft-modified elastomer (b) and an amino compound (c) and being excellent in impact resistance.

TECHNICAL BACKGROUND

Conventional polyolefins are resins excellent in chemical resistance and solvent resistance, but cannot be said to have sufficient rigidity and heat resistance, when their crystallinity is low.

In order to improve polyolefins in heat resistance and rigidity, there is therefore employed a method in which a nucleating agent is added or a polyolefin in a molten state is gradually cooled to increase the crystallinity. However, the effect thereof cannot be said to be satisfactory.

Apart from such conventional polyolefins, it is reported that a copolymer obtained by reaction of ethylene with a bulky monomer is excellent over conventional polyolefins in various properties such as heat resistance, etc. (U.S. Pat. No. 2,883,372 and Japanese Patent Publication No. 14910/1971).

The assignee of the present application already found that a cycloolefin random copolymer obtained by copolymerization of a specific cycloolefin as a bulky monomer and ethylene is excellent in heat resistance, thermal aging resistance, solvent resistance, dielectric properties and rigidity. On the basis of this finding, the assignee of the present application has already proposed inventions of random copolymers obtained from specific cycloolefins (Japanese Laid-Open Patent Publications Nos. 168708/1985, 98780/1986, 115912/1986, 115916/1986, 120816/1986 and 252407/1987).

DISCLOSURE OF THE INVENTION

It is an object of the present invention to further improve such a resin composition containing a cycloolefin-based resin as mentioned above in mechanical properties such as impact strength.

It is another object of the present invention to provide a cycloolefin random copolymer-containing resin composition being further improved particularly in mechanical properties such as impact strength without impairing excellent properties of cycloolefin-based resins.

Other objects and advantages of the present invention will be apparent from the following description. According to the present invention, the above objects and advantages of the present invention are achieved by a polyolefin resin composition comprising:

(a) at least one cycloolefin-based polymer selected from the group consisting of a homopolymer (a1) derived from one of cycloolefins of the following formula (I),

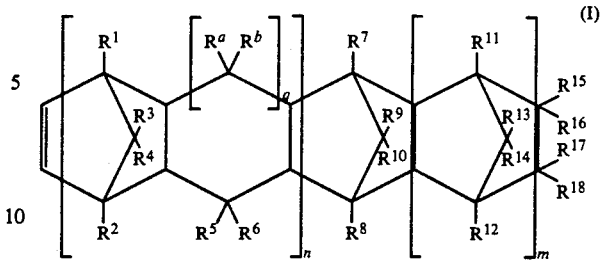

(wherein n is 0 or 1, m is 0 or a positive integer, q is 0 or 1, each of $R^1$ to $R^{18}$, $R^a$ and $R^b$ is, independently of the other, an atom or a group selected from the class consisting of a hydrogen atom, a halogen atom and a hydrocarbon group, the two of $R^{15}$ to $R^{18}$ may bond to each other to form a monocyclic or polycyclic group which may have a double bond, and further, a combination of $R^{15}$ and $R^{16}$ or a combination of $R^{17}$ and $R^{18}$ may form an alkylidene group), a copolymer (a2) derived from said cycloolefins, a hydrogenation polymer (a3) of the homopolymer (a1) or the copolymer (a2), and a cycloolefin/ethylene random copolymer (a4) composed of a polymer unit derived from said cycloolefins and a polymer unit of ethylene, (b) an elastomer being graft-modified with an unsaturated carboxylic acid or a derivative thereof and having a tensile modulus, at 23° C., of 0.1 to 2,000 kg/cm², and (c) a compound having one amino group in the molecule, (d) the polyolefin resin composition containing, per 100 parts by weight of the total amount of the component (a), the component (b) and the component (c), 50 to 95 parts by weight of the component (a), 1 to 50 parts by weight of the component (b) and 0.01 to 45 parts by weight of the component (c).

The polyolefin resin composition of the present invention basically comprises a cycloolefin-based polymer (a), a graft-modified elastomer (b) and a compound (c) having one amino group in the molecule as described above. The composition of the present invention can provide molded articles being improved particularly in mechanical properties such as impact strength and in surface gloss without impairing excellent properties of cycloolefin-based resins.

The polyolefin resin composition of the present invention will be specifically described hereinafter.

The polyolefin resin composition according to the present invention is a composition composed basically of a cycloolefin-based polymer (a), a graft-modified elastomer (b) and a specific, amino group-containing compound (c).

The component (a) used in the present invention, i.e., the cycloolefin-based polymer, is selected from the class consisting of a homopolymer (a1) derived from one of cycloolefins of the above formula (I), a copolymer (a2) derived from said cycloolefins, a hydrogenation polymer of the homopolymer (a1) or the copolymer (a2) and a cycloolefin/ethylene random copolymer (a4) composed of a polymer unit derived from said cycloolefins and a polymer unit of ethylene. These cycloolefin-based polymers may be used alone or in combination of two or more.

In the above formula (I), n is 0 or 1, m is 0 or a positive integer, and q is 0 or 1.

Each of $R^1$ to $R^{18}$, $R^a$ and $R^b$ is, independently of the other, is an atom or a group selected from the class consisting of a hydrogen atom, a halogen atom and a hydrocarbon group. The halogen atom includes, for example, a fluorine atom, a chlorine atom, a bromine atom and an iodine atom. The hydrocarbon group preferably includes, for example, an alkyl group having 1 to 20 carbon atoms and a cycloalkyl group having 3 to 15 carbon atoms. Examples of the alkyl group are preferably methyl, ethyl, propyl, isopropyl, amyl, hexyl, octyl, decyl, dodecyl and octadecyl. The cycloalkyl group preferably is, for example, cyclohexyl.

In the above formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may bond to each other (jointly with each other) to form a monocyclic or polycyclic group. And, these monocyclic and polycyclic groups may have a double bond.

Further, $R^{15}$ and $R^{16}$, or $R^{17}$ and $R^{18}$ may form an alkylidene group. Such an alkylidene group preferably includes an alkylidene group having 2 to 20 carbon atoms. Examples of such an alkylidene group are preferably an ethylidene group, a propylidene group and an isopropylidene group.

The intrinsic viscosity [$\eta$] of the above cycloolefin-based resins, measured in decalin at 135° C., is preferably in the range of 0.3 to 2.0 dl/g, more preferably in the range of 0.4 to 1.2 dl/g. The softening temperature (TMA) thereof, measured with a thermal mechanical analyzer, is preferably in the range of 70° to 200° C., more preferably in the range of 100° to 180° C. Further, the glass transition temperature (Tg) thereof is preferably in the range of 50° to 190° C., preferably in the range of 80° to 170° C., and the crystallinity thereof, measured by an X-ray diffraction method, is preferably in the range of 0 to 20%, more preferably in the range of 0 to 2%.

Among the above cycloolefin-based resins, the polymer (a1), the copolymer (a2) and the hydrogenation polymers (a3) of these are basically formed of ring-opening polymerization polymers derived from cycloolefins.

The polymer (a1) and the copolymer (a2) can be produced, for example, by (co)polymerizing cycloolefins of the above formula (I) in the presence of a catalyst comprising any one of a halide of a metal such as ruthenium, rhodium, palladium, osmium, indium or platinum; nitrate; and an acetylacetone compound and a reducing agent; or a catalyst comprising either a halide of a metal such as titanium, palladium, zirconium or molybdenum or an acetylacetone compound and an organoaluminum.

The hydrogenation polymer (a3) can be produced, for example, by reducing the above-obtained ring-opening polymerization polymer of a cycloolefin, (a1) or (a2), with hydrogen in the presence of a hydrogenating catalyst.

The cycloolefin/ethylene random copolymer (a4) can be produced, for example, by copolymerizing ethylene and an unsaturated monomer of the above formula (I) in a liquid phase in the presence of a catalyst.

The cycloolefins of the above formula (I) can be easily produced by condensing cyclopentadienes and corresponding olefins or corresponding cycloolefins under a Diels-Alder reaction.

That is, the cycloolefins of the above formula (I), used in the present invention, specifically include the following compounds:
Bicyclo[2.2.1]hept-2-enes,
Tetraccyclo[4.4.0.1$^{2,5}$.1$^{7,10}$]-3-dodecenes,
Hexacyclo[6.6.1.1$^{3,6}$.1$^{10,13}$.0$^{2,7}$.0$^{9,14}$]-4-heptadecenes,
Octacyclo[8.8.0.1$^{2,9}$.1$^{4,7}$.1$^{11,18}$.1$^{13,16}$.0$^{3,8}$.0$^{12,17}$]-5-docosenes,
Pentacyclo[6.6.1.1$^{3,6}$.0$^{2,7}$.0$^{9,14}$]-4-hexadecenes,
Heptacyclo-5-eicosenes,
Heptacyclo-5-heneicosenes,
Tricyclo[4.3.0.1$^{2,5}$]-3-decenes,
Tricyclo[4.4.0.1$^{2,5}$]-3-undecenes,
Pentacyclo[6.5.1.1$^{3,6}$.0$^{2,7}$.0$^{9,13}$]-4-pentadecenes,
Pentacyclopentadecadienes,
Pentacyclo[4.7.0.1$^{2,5}$.0$^{8,13}$.1$^{9,12}$]-3-pentadecenes,
Heptacyclo[7.8.0.1$^{3,6}$.0$^{2,7}$.1$^{10,17}$.0$^{11,16}$.1$^{12,15}$]-4-eicosenes,
Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosenes,
Petacyclo[4.8.4$^{2,5}$.0$^{8,13}$.1$^{9,12}$]-3-hexadecenes,
Heptacyclo[8.8.0.0$^{3,8}$.1$^{4,7}$.1$^{11,18}$.0$^{12,17}$.1$^{13,16}$]-5-heneicosenes, and
Nonacyclo[10.10.1.0$^{2,11}$.0$^{4,9}$.1$^{5,8}$.0$^{13,22}$.1$^{14,21}$.0$^{15,20}$.1$^{16,19}$]-6-hexacosenes.

Specific examples of the above compounds are as follows:
Bicyclo[2.2.1]hept-2-enes;
bicyclo[2.2.1]hept-2-ene

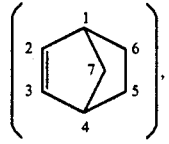

6-methylbicyclo[2.2.1]hept-2-ene,
5,6-dimethylbicyclo[2.2.1]hept-2-ene,
1-methylbicyclo[2.2.1]hept-2-ene,
6-ethylbicyclo[2.2.1]hept-2-ene,
6-n-butylbicylo[2.2.1]hept-2-ene,
6-isobutylbicyclo[2.2.1]hept-2-ene, and
7-methylbicyclo[2.2.1]hept-2-ene:
Tetraccyclo[4.4.0.1$^{2,5}$.1$^{7,10}$]-3-dodecenes;
tetracyclo[4.4.0.1$^{2,5}$.1$^{7,10}$]-3-dodecene

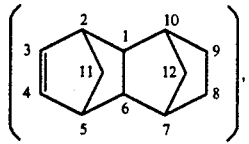

5,10-dimethyltetracyclo[4.4.0.1$^{2,5}$.1$^{7,10}$]-3-dodecene,
2,10-dimethyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-triemthyltetracyclo[4.4.0.1$^{2,5}$.1$^{7,10}$]-3-dodecene,
9-ethyl-2,7-dimethyltetracyclo[4.4.0.1$^{2,5}$.1$^{7,10}$]-3-dodecene,
9-isobutyl-2,7-dimethyltetracyclo[4.4.0.1$^{2,5}$.1$^{7,10}$]-3-dodecene,
9,11,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene,
9-isobutyl-11,12-dimethyltetracyclo[4.4.0.1$^{2,5}$.1$^{7,10}$]-3-dodecene,
5,8,9,10-tetramethyltetracyclo[4.4.0.1$^{2,5}$.1$^{7,10}$]-3-dodecene,
8-methyltetracyclo[4.4.0.1$^{2,5}$.1$^{7,10}$]-3-dodecene,
8-ethyltetracyclo[4.4.0.1$^{2,5}$.1$^{7,10}$]-3-dodecene,
8-propyltetracyclo[4.4.0.1$^{2,5}$.1$^{7,10}$]-3-dodecene,
8-hexyltetracyclo[4.4.0.1$^{2,5}$.1$^{7,10}$]-3-dodecene,
8-stearyltetracyclo[4.4.0.1$^{2,5}$.1$^{7,10}$]-3-dodecene,
8,9-dimethyltetracyclo[4.4.0.1$^{2,5}$.1$^{7,10}$]-3-dodecene,
8-ethyl-9-methyltetracyclo[4.4.0.1$^{2,5}$.1$^{7,10}$]-3-dodecene,
8-chlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-fluorotetracyclo[4.4.0.1$^{2,5}$.1$^{7,10}$]-3-dodecene,
8,9dichlorotetracyclo[4.4.0.1$^{2,5}$.1$^{7,10}$]-3-dodecene,
8-cyclohexyltetracyclo[4.4.0.1$^{2,5}$.1$^{7,10}$]-3-dodecene,
8-isobutyltetracyclo[4.4.0.1$^{2,5}$.1$^{7,10}$]-3-dodecene,
8-butyltetracyclo[4.4.0.1$^{2,5}$.1$^{7,10}$]-3-dodecene,
8-ethylidenetetracyclo[4.4.0.1$^{2,5}$.1$^{7,10}$]-3-dodecene,
8-ethylidene-9-methyltetracyclo[4.4.0.1$^{2,5}$.1$^{7,10}$]-3-dodecene,
8-ethylidene-9-ethyltetracyclo[4.4.0.1$^{2,5}$.1$^{7,10}$]-3-dodecene,
8-ethylidene-9-isopropyltetracyclo[4.4.0.1$^{2,5}$.1$^{7,10}$]-3-dodecene,
8-ethylidene-9-butyltetracyclo[4.4.0.1$^{2,5}$.1$^{7,10}$]-3-dodecene,
8-n-propylidenetetracyclo[4.4.0.1$^{2,5}$.1$^{7,10}$]-3-dodecene,
8-n-propylidene-9-methyltetracyclo[4.4.0.1$^{2,5}$.1$^{7,10}$]-3-dodecene,
8-n-propylidene-9-ethyltetracyclo[4.4.0.1$^{2,5}$.1$^{7,10}$]-3-dodecene,
8-n-propylidene-9-isopropyltetracyclo[4.4.0.1$^{2,5}$.1$^{7,10}$]-3-dodecene,
8-n-propylidene-9-butyltetracyclo[4.4.0.1$^{2,5}$.1$^{7,10}$]-3-dodecene,
8-isopropylidenetetracyclo[4.4.0.1$^{2,5}$.1$^{7,10}$]-3-dodecene,
8-isopropylidene-9-methyltetracyclo[4.4.0.1$^{2,5}$.1$^{7,10}$]-3-dodecene,
8-isopropylidene-9-ethyltetracyclo[4.4.0.1$^{2,5}$.1$^{7,10}$]-3-dodecene,
8-isopropylidene-9-isopropyltetracyclo[4.4.0.1$^{2,5}$.1$^{7,10}$]-3-dodecene,
8-isopropylidene-9-butyltetracyclo[4.4.0.1$^{2,5}$.1$^{7,10}$]-3-dodecene:
Hexacyclo[6.6.1.1$^{3,6}$.1$^{10,13}$.0$^{2,7}$.0$^{9,14}$]-4-heptadecene;
hexacyclo[6.6.1.1$^{3,6}$.1$^{10,13}$.0$^{2,7}$.0$^{9,14}$]-4-heptadecene

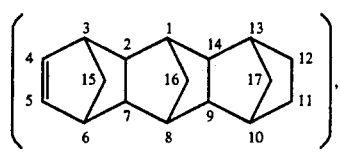

12-methylhexacyclo-[6.6.1.1$^{3,6}$.1$^{10,13}$.0$^{2,7}$.0$^{9,14}$]-4-heptadecene,
12-ethylhexacyclo-[6.6.1.1$^{3,6}$.1$^{10,13}$.0$^{2,7}$.0$^{9,14}$]-4-heptadecene,
12-isobutylhexacyclo-[6.6.1.1$^{3,6}$.1$^{10,13}$.0$^{2,7}$.0$^{9,14}$]-4-heptadecene, and 1,6,10-trimethyl-12-isobutylhexacyclo[6.6.1.1$^{3,6}$.1$^{10,13}$.0$^{2,7}$.0$^{9,14}$]-4-heptadecene:
Octacyclo[8.8.0.1$^{2,9}$.1$^{4,7}$.1$^{11,18}$.1$^{13,16}$.0$^{3,8}$.0$^{12,17}$]-5-docosenes;
octacyclo[8.8.0.1$^{2,9}$.1$^{4,7}$.1$^{11,18}$.1$^{13,16}$.0$^{3,8}$.0$^{12,17}$]-5-docosene 15-methyloctacyclo[8.8.0.1$^{2,9}$.1$^{4,7}$.1$^{11,18}$.1$^{13,16}$.0$^{3,8}$.0$^{12,17}$]-5-docosene,
15-ethyloctacyclo[8.8.0.1$^{2,9}$.1$^{4,7}$.1$^{11,18}$.1$^{13,16}$.0$^{3,8}$.0$^{12,17}$]-5-docosene:
Pentacyclo[6.6.1.1$^{3,6}$.0$^{2,7}$.0$^{9,14}$]-4-hexadecenes;
pentacyclo[6.6.1.1$^{3,6}$.0$^{2,7}$.0$^{9,14}$]-4-hexadecene 1,3-dimethylpentacyclo[6.6.1.1$^{3,6}$.0$^{2,7}$.0$^{9,14}$]-4-hexadecene,
1,6-dimethylpentacyclo[6.6.1.1$^{3,6}$.0$^{2,7}$.0$^{9,14}$]-4-hexadecene,
15,16-dimethylpentacyclo[6.6.1.1$^{3,6}$.0$^{2,7}$.0$^{9,14}$]-4-hexadecene:
Heptacyclo-5-eicosenes;
heptacyclo[8.7.0.1$^{2,9}$.1$^{4,7}$.1$^{11,17}$.0$^{3,8}$.0$^{12,16}$]-5-eicosene Heptacyclo-5-heneicosens;
heptacyclo[8.8.0.1$^{2,9}$.1$^{4,7}$.1$^{11,18}$.0$^{3,8}$.0$^{12,17}$]-5-heneicosene Tricyclo[4.3.0.1$^{2,5}$]-3-decenes;
tricyclo[4.3.0.1$^{2,5}$]-3-decene

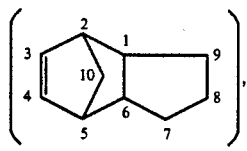

2-methyltricyclo[4.3.0.1$^{2,5}$]-3-decene,
5-methyltricyclo[4.3.0.1$^{2,5}$]-3-decene:
Tricyclo[4.4.0.1$^{2,5}$]-3-undecenes;
tricyclo[4.4.0.1$^{2,5}$]-3-undecene

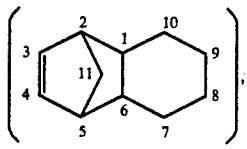

10-methyl-tricyclo[4.4.0.1$^{2,5}$]-3-undecene:
Pentacyclo[6.5.1.1$^{3,6}$.0$^{2,7}$.0$^{9,13}$]-4-pentadecenes;
pentacyclo[6.5.1.1$^{3,6}$.0$^{2,7}$.0$^{9,13}$]-4-pentadecene

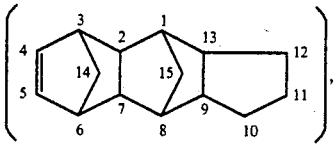

1,3-dimethyl-pentacyclo[6.5.1.1$^{3,6}$.0$^{2,7}$.0$^{9,13}$]-4-pentadecene,
1,6-dimethylpentacyclo[6.5.1.1$^{3,6}$.0$^{2,7}$.0$^{9,13}$]-4-pentadecene,
14,15-dimethylpentacyclo[6.5.1.1$^{3,6}$.0$^{2,7}$.0$^{9,13}$]-4-pentadecene:
Pentacyclopentadecadienes;
pentacyclo[6.5.1.1$^{3,6}$.0$^{2,7}$.0$^{9,13}$]-4,10-pentadecadiene

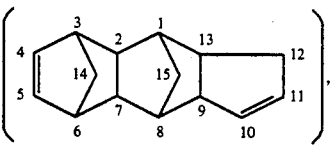

Pentacyclo[4.7.0.1$^{2,5}$.0$^{8,13}$.1$^{9,12}$]-3-pentadecenes;
pentacyclo[4.7.0.1$^{2,5}$.0$^{8,13}$.1$^{9,12}$]-3-pentadecene

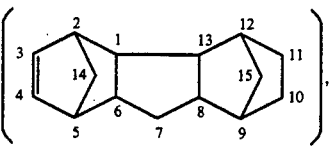

methyl-substituted pentacyclo[4.7.0.1$^{2,5}$.0$^{8,13}$.1$^{9,12}$]-3-pentadecene:
Heptacyclo[7.8.0.1$^{3,6}$.0$^{2,7}$.1$^{10,17}$.0$^{11,16}$.1$^{12,15}$]-4-eicosenes;
heptacyclo[7.8.0.1$^{3,6}$.0$^{2,7}$.1$^{10,17}$.0$^{11,16}$.1$^{12,15}$]-4-eicosene

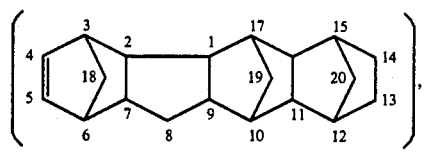

dimethyl-substituted heptacyclo[7.8.0.1$^{3,6}$.0$^{2,7}$.1$^{10,17}$.0$^{11,16}$.1$^{12,15}$]-4-eicosene:
Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosenes;
nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene

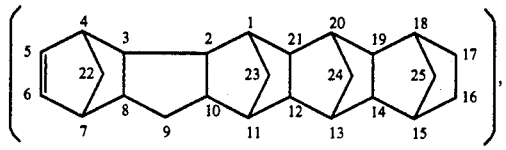

trimethyl-substituted nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene:
Pentacyclo[4.8.4$^{2,5}$.0$^{8,13}$.1$^{9,12}$]-3-hexadecenes;
pentacyclo[4.8.4$^{2,5}$.0$^{8,13}$.1$^{9,12}$]-3-hexadecene

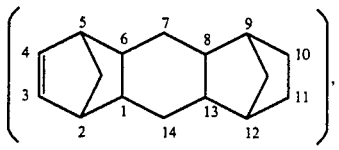

10-methyl-pentacyclo[4.8.4$^{2,5}$.0$^{8,13}$.1$^{9,12}$]-3-hexadecene,
10-ethyl-pentacyclo[4.8.4$^{2,5}$.0$^{8,13}$.1$^{9,12}$]-3-hexadecene,
10,11-dimethyl-pentacyclo[4.8.4$^{2,5}$.0$^{8,13}$.1$^{9,12}$]-3-hexadecene:
Heptacyclo[8.8.0.0$^{3,8}$.1$^{4,7}$.1$^{11,18}$.0$^{12,17}$.1$^{13,16}$]-5-heneicosenes;
heptacyclo[8.8.0.0$^{3,8}$.1$^{4,7}$.1$^{11,18}$.0$^{12,17}$.1$^{13,16}$]-5-heneicosene

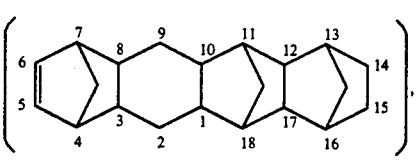

14-methyl-heptacyclo[8.8.0.0$^{3,8}$.1$^{4,7}$.1$^{11,18}$.0$^{12,17}$.1$^{13,16}$]-5-heneicosene,
trimethyl-heptacyclo[8.8.0.0$^{3,8}$.1$^{4,7}$.1$^{11,18}$.0$^{12,17}$.1$^{13,16}$]-5-heneicosene:
Nonacyclo[10.10.1.0$^{2,11}$.0$^{4,9}$.1$^{5,8}$.0$^{13,22}$.1$^{14,21}$.0$^{15,20}$.1$^{16,19}$]-6-hexacosenes;
nonacyclo[10.10.1.0$^{2,11}$.0$^{4,9}$.1$^{5,8}$.0$^{13,22}$.1$^{14,21}$.0$^{15,20}$.1$^{16,19}$]-6-hexacosene

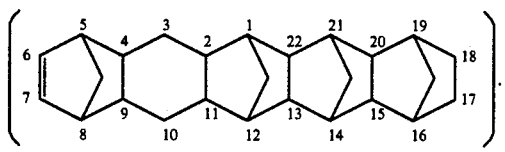

The cycloolefin/ethylene random copolymer (a4) can be obtained by copolymerizing a cycloolefin of the above formula (I), ethylene and optionally, other olefin compound.

The other olefin compound copolymerizable with ethylene and the cycloolefin compound of the above formula (I) in the present invention is selected from α-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene, and 1-eicosene;

cycloolefins such as cyclopentene, cyclohexene, 3-methylcyclohexene, cyclooctene, and 3a,5,6,7a-tetrahydro-4,7-methano-1H-indene;

conjugated dienes such as 1,4-hexadiene, 4-methyl-1,4-hexadiene, 5-methyl-1,4-hexadiene, 1,7-octadiene, dicyclopentadiene, 5-ethylidene-2-norbornene, and 5-vinyl-2-norbornene; and norbornenes such as norbornene-2, 5-methylnorbornene-2, 5-ethylnorbornene-2, 5-isopropylnorbornene-2, 5-n-butylnorbornene-2, 5-i-butylnorbornene-2, 5,6-dimethylnorbornene-2, 5-chloronorbornene-2, 2-fluoronorbornene-2, and 5,6-dichloronorbornene-2.

The above "other olefin" is used in an amount, based on the total amount of the cycloolefin, ethylene and this other olefin, of preferably not more than about 20 mol %, more preferably not more than 10 mol %.

The above reaction of ethylene, the cycloolefin of the formula (I) and optionally other olefin is generally carried out in a hydrocarbon solvent. The hydrocarbon solvent used in this reaction is selected, for example, from aliphatic hydrocarbons such as hexane, heptane, octane and kerosene; alicyclic hydrocarbons such as cyclohexane and methylcyclohexane; and aromatic hydrocarbons such as benzene, toluene and xylene. Further, polymerizable unsaturated monomers which can be used for the preparation of the cycloolefin random copolymer and which are liquid compounds at a reaction temperature may be used as a reaction solvent. These solvents may be used alone or in combination.

The catalyst used for the reaction of the above olefin with the cycloolefin of the formula (I) is selected from catalysts comprising vanadium compounds soluble in a hydrocarbon solvent used as a reaction solvent and organoaluminum compounds.

Examples of the vanadium compounds used as a catalyst are compounds of the formula, $VO(OR)_aV_b$ or the formula, $V(OR)_cX_d$.

In the above formulae, R is a hydrocarbon group, and there are relations of $0 \leq a \leq 3$, $0 \leq b \leq 3$, $2 \leq a+b \leq 3$, $0 \leq c \leq 4$, $0 \leq d \leq 4$ and $3 \leq c+d \leq 4$.

Further, the vanadium compounds may be adducts of vanadium compounds of the above formulae with electron donors.

Examples of the above vanadium compounds are:
$VOCl_3$,
$VO(OC_2H_5)Cl_2$,
$VO(OC_2H_5)_2Cl$,
$VO(O\text{—iso—}C_3H_7)Cl_2$,
$VO(O\text{—n—}C_4H_9)Cl_2$,
$VO(OC_2H_5)_3$,
$VOBr_2$,
$VCl_4$,
$VOCl_2$,
$VO(O\text{—n—}C_4H_9)_3$, and
$VCl_3 \cdot 2(OC_8H_{17}OH)$.

These vanadium compounds may be used alone or in combination.

Examples of the electron donors which form adducts with the above vanadium compounds are oxygen-containing electron donors such as alcohol, phenols, ketone, aldehyde, carboxylic acid, organic or inorganic acid ester, ether, acid amide, acid anhydride, and alkoxysilane, and nitrogen-containing electron donors such as ammonia, amine, nitrile and isocyanate.

Specific compound usable as such an electron donor is selected from:

alcohols having 1 to 18 carbon atoms such as methanol, ethanol, propanol, pentanol, hexanol, octanol, dodecanol, octadecyl alcohol, oleyl alcohol, benzyl alcohol, phenyl ethyl alcohol, cumyl alcohol, isopropyl alcohol, and isopropylbenzyl alcohol;

phenols having 6 to 20 carbon atoms such as phenol, cresol, xylenol, ethylphenol, propylphenol, nonylphenol, cumylphenol, and naphthol (these phenols may have a lower alkyl group);

ketones having 3 to 15 carbon atoms such as acetone, methyl ethyl ketone, methyl isobutyl ketone, acetophenone, benzophenone, and benzoquinone;

aldehydes having 2 to 15 carbon atoms such as acetaldehyde, propionaldehyde, octylaldehyde, benzaldehyde, tolualdehyde, and naphthoaldehyde;

organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl Nadic acid ester, diisopropyl tetrahydrophthalate, diethyl phthalate, di-n-butyl phthalate, di-2-ethylhexyl phthalate, γ-butyrolactone, δ-valerolactone, coumarin, phthalide, and ethylene carbonate;

acid halides having 2 to 15 carbon atoms such as acetyl chloride, benzoyl chloride, toluic acid chloride, and anisic acid chloride;

ethers having 2 to 20 carbon atoms such as methyl ether, ethyl ether, isopropyl ether, butyl ether, amyl ether, tetrahydrofuran, anisole, and diphenyl ether;

acid amides such as acetic amide, benzoic amide, and toluic amide, amines such as methylamine, ethylamine, diethylamine, tributylamine, piperidine, tribenzylamine, aniline, pyridine, picoline, and tetramethylenediamine;

nitriles such as acetonitrile, benzonitrile, and tolunitrile; and alkoxysilanes such as ethyl silicate and diphenyldimethoxysilane. These electron donors may be used alone or in combination.

The organoaluminum compounds usable in the above reaction have at least one Al-carbon bond in the molecule.

Examples of the organoaluminum compounds used above are:

(i) organoaluminum compounds of the formula,
$R^{21}_e Al(OR^{22})_f H_g X_h$, (wherein each of $R^{21}$ and $R^{22}$ is, independently of the other, a hydrocarbon group which generally has 1 to 15 carbon atoms, preferably has 1 to 4 carbon atoms, X is a halogen, e is defined by $0 \leq e \leq 3$, f is defined by $0 \leq f < 3$, g is defined by $0 \leq g < 3$, h is defined by $0 \leq h < 3$, and $e+f+g+h=3$), and (ii) alkylation product complexes of a Group 1 metal and aluminum, of the formula, $M^1 Al R^{21}_4$, (wherein $M^1$ is Li, Na or K and $R^{21}$ is as defined above).

Specific examples of the organoaluminum compounds of the above formula (i) are as follows.

Compounds of the formula, $R^{21}_i Al(OR^{22})_{3-i}$, (wherein $R^{21}$ and $R^{22}$ are as defined above, and i is preferably a number defined by $1.5 \leq i < 3$).

Compounds of the formula, $R^{21}_e Al X_{3-e}$, (wherein $R^{21}$ is as defined above, X is a halogen, e is preferably defined by $0 < e < 3$).

Compounds of the formula, $R^{21}_j Al H_{3-j}$, (wherein $R^{21}$ is as defined above, and j is preferably defined by $2 \leq j < 3$).

Compounds of the formula, $R^{21}_e Al(OR^{22})_f X_h$, (wherein $R^{21}$ and $R^{22}$ are as defined above, X is a halogen, $0 < e \leq 3$, $0 \leq f < 3$, $0 \leq h < 3$, and $e+f+H=3$).

Specific examples of the organoaluminum compounds of the above formula (II) are:

trialkylaluminum such as triethylaluminum and tributylaluminum;

trialkylaluminum such as triisopropylaluminum, dialkylaluminum alkoxides such as diethylaluminum ethoxide, and dibutylaluminum butoxide;

alkylaluminum sesquialkoxides such as ethylaluminum sesquiethoxide, and butylaluminum sesquibutoxide;

partially alkoxylated alkylaluminum having an average composition of the formula, $R^{21}_{2.5} Al(OR^{22})_{0.5}$, etc;

dialkylaluminum halides such as diethylaluminum chloride, dibutylaluminum chloride, and diethylaluminum bromide;

alkylaluminum sesquihalides such as ethylaluminum sesquichloride, butylaluminum sesquichloride, and ethylaluminum sesquibromide;

partially halogenated alkylaluminum such as ethylaluminum dichloride, propylaluminum dichloride, and butylaluminum dibromide;

dialkylaluminum hydrides such as diethylaluminum hydride and dibutylaluminum hydride;

partially hydrogenated alkylaluminum such as alkylaluminum dihydrides, e.g., ethylaluminum dihydride and propylaluminum dihydride; and partially alkoxylated and halogenated alkylaluminum such as ethylaluminum ethoxychloride, butylaluminum butoxychloride, and ethylaluminum ethoxybromide.

The organoaluminum compound may also be a compound similar to the compounds of the formula (ii) such as aluminum compounds in which two or more aluminum atoms are bonded through an oxygen atom or a nitrogen atom. Specific examples of such a compound are:

$(C_2H_5)_2 AlOAl(C_2H_5)_2$, $(C_4H_9)_2 AlOAl(C_4H_9)_2$, and

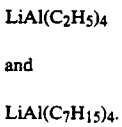

Examples of the organoaluminum compounds of the formula (ii) are:

$LiAl(C_2H_5)_4$ and $LiAl(C_7H_{15})_4$.

of these, it is preferred to use alkylaluminum halide, alkylaluminum dihalide or a mixture of these.

The amount, as a vanadium atom, of the above vanadium compound for use is generally in the range of 0.01 to 5 gram-atom/lit., preferably in the range of 0.05 to 3 gram-atom/lit. The amount of the organoaluminum compound, as a ratio of an aluminum atom to a vanadium atom (Al/V) in a polymerization reaction system, is generally not less than 2, preferably 2 to 50, particularly preferably 3 to 20.

The cycloolefin-based polymer (a) obtained in the presence of the above catalyst contains preferably 52 to 90 mol %, more preferably 55 to 80 mol % of an ethylene component unit, and it contains preferably 10 to 48 mol %, more preferably 20 to 45 mol % of a recurring unit derived from the cycloolefin. In addition, when the cycloolefin-based polymer (a) contains an olefin component unit other than the ethylene component unit, the content of this olefin component unit in the cycloolefin-based polymer is preferably not more than 20 mol %, more preferably not more than 10 mol %.

In the cycloolefin-based polymer (a) used in the present invention, the ethylene component unit and the recurring one derived from the cycloolefin are substantially linearly arranged, and further these recurring units are arranged at random.

In the cycloolefin-based polymer (a) used in the present invention, the recurring unit which constitutes the alicyclic structure has a structure of the following formula (II),

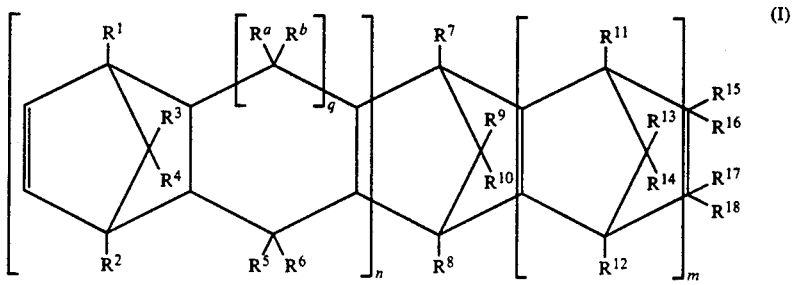

wherein $R^1$ to $R^{18}$, n, m and q are as defined in the above formula (I).

The above cycloolefin-based polymer is incorporated in an amount in the range of 50 to 95 parts by weight per 100 parts by weight of the total amount of the component (a), the component (b) and the component (c). In particular, it is preferred to adjust this amount to the range of 60 to 85 parts by weight.

When the component (a) is incorporated in the above amount, there can be obtained a resin composition which is improved in mechanical properties such as impact strength, etc., without impairing excellent properties of the cycloolefin-based polymer (a).

The graft-modified elastomer (b) used in the present invention is an elastomer which is obtained by graft-modification with an unsaturated carboxylic acid or a derivative thereof and has a tensile modulus, at 23° C., of 0.1 to 2,000 kg/cm$^2$. The tensile modulus is preferably in the range of 1 to 1,500 kg/cm$^2$. The glass transition temperature (Tg) of this graft-modified elastomer is preferably in the range of $-150°$ to $+50°$ C., more preferably in the range of $-80°$ to $-20°$ C. The intrinsic viscosity [$\eta$], measured in decalin at 135° C., of this graft-modified elastomer is preferably 0.2 to 10 dl/g, more preferably 1 to 5 dl/g. The density thereof is preferably 0.82 to 0.96 g/cm$^3$, more preferably 0.84 to 0.92 g/cm$^3$. Further, the crystallinity, measured by an X-ray diffraction method, of this graft-modified elastomer is preferably not more than 30%, more preferably not more than 25%.

When the graft-modified elastomer (b) used in the present invention is a graft-modified $\alpha$-olefin copolymer, specific examples of the graft-modified $\alpha$-olefin copolymer are:

(i) graft-modified ethylene.$\alpha$-olefin copolymer rubber, and (ii) graft-modified propylene.$\alpha$-olefin copolymer rubber. The above graft-modified ethylene.$\alpha$-olefin copolymer rubber (i) and graft-modified propylene.$\alpha$-olefin copolymer rubber (ii) may be used alone or in combination.

The $\alpha$-olefin to constitute the above graft-modified ethylene.$\alpha$-olefin copolymer rubber (i) is generally selected from $\alpha$-olefins having 3 to 20 carbon atoms such as propylene, 1-butene, 1-pentene, 1-hexene, 4-methyl-1-pentene, 1-octene, 1-decene and mixtures of these. Of these, particularly preferred are propylene and/or 1-butene.

The $\alpha$-olefin to constitute the graft-modified propylene.$\alpha$-olefin copolymer rubber (ii) is generally selected from $\alpha$-olefins having 4 to 20 carbon atoms such as 1-butene, 1-pentene, 1-hexene, 4-methyl-1-pentene, 1-octene, 1-decene and mixtures of these. Of these, particularly preferred is 1-butene.

In addition, the $\alpha$-olefin copolymer used in the present invention may contain a component unit other than the unit derived from the $\alpha$-olefin, such as a component unit derived from a diene compound, in such an amount that does not impair the properties of the $\alpha$-olefin copolymer.

Examples of the component unit which may be contained in the $\alpha$-olefin copolymer used in the present invention are linear non-conjugated dienes such as 1,4-hexadiene, 1,6-octadiene, 2-methyl-1,5-hexadiene, 6-methyl-1,5-heptadiene, and 7-methyl-1,6-octadiene;

cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene;

components units derived from diene compounds such as 2,3-diisopropylidene-5-norbornene, 2-ethylidene-3-isopropylidene-5-norbornene, and 2-propenyl-2,2-norbornadiene; and the above cycloolefin components. The content of the above diene component is preferably not more than 10 mol %, more preferably not more than 5 mol %.

In the graft-modified ethylene.$\alpha$-olefin copolymer (i) used in the present invention, although differing depending upon the kind of the $\alpha$-olefin, the molar ratio of ethylene to the $\alpha$-olefin (ethylene/$\alpha$-olefin) is preferably 10/90 to 90/10, more preferably 50/50 to 90/10. When the $\alpha$-olefin is propylene, the above molar ratio is preferably 50/50 to 90/10. When the $\alpha$-olefin is an $\alpha$-olefin having 4 or more carbon atoms, the above molar ratio is preferably 50/50 to 90/10.

In the graft-modified propylene.$\alpha$-olefin copolymer (ii) used in the present invention, although differing depending upon the kind of the $\alpha$-olefin, the molar ratio of propylene to the $\alpha$-olefin (propylene/$\alpha$-olefin) is, in general, preferably 50/50 to 90/10. When the $\alpha$-olefin is 1-butene, the above molar ratio is preferably 50/50 to 90/10. When the $\alpha$-olefin is an $\alpha$-olefin having 5 or more carbon atoms, it is preferably 50/50 to 90/10.

In the present invention, it is preferred to select, out of the above graft-modified elastomers (b), a copolymer obtained by graft-modification of an ethylene propylene random copolymer or ethylene.$\alpha$-olefin random copolymer having an ethylene content of 35 to 50 mol % and a crystallinity of not more than 10% with a graft monomer, since such a copolymer has an excellent effect on improvement of mechanical properties such as impact strength.

The graft monomer used for the preparation of the graft-modified elastomer (b) used in the present invention is selected from unsaturated carboxylic acids or derivatives thereof. Examples of the unsaturated carboxylic acid are acrylic acid, maleic acid, fumaric acid, tetrahydrophthalic acid, itaconic acid, citraconic acid, crotonic acid, isocrotonic acid, and Nadic acid Ⓡ (endo-cis-bicyclo[2,2,1]hept-5-ene-2,3-dicarboxylic acid). Examples of the derivatives of the above unsaturated carboxylic acid are unsaturated carboxylic acid anhydrides, unsaturated carboxylic acid halides, unsaturated carboxylic acid amides, unsaturated carboxylic acid imides and ester compounds of unsaturated carboxylic acids. Specific examples of these derivatives are malenyl chloride, maleimide, maleic anhydride, citraconic anhydride, monomethyl maleate, dimethyl maleate, glycidyl meleate, glycidyl acrylate, and glycidyl methacrylate.

These graft monomers may be used alone or in combination.

Of the above graft monomers, preferred are unsaturated carboxylic acids or anhydrides thereof, and particularly preferred are maleic acid, Nadic acid Ⓡ and anhydrides of these or glycidyl methacrylate and glycidyl acrylate.

The graft-modified elastomer (b) used in the present invention can be prepared, for example, by modifying the $\alpha$-olefin copolymer with the above graft monomer by any one of various known methods. For example, there is available a method in which the above $\alpha$-olefin copolymer is melted and the graft monomer is added thereto for graft polymerization, or a method in which the graft monomer dissolved in a solvent is added for graft polymerization. Further, the graft-modified elastomer can be also prepared by other method in which the graft monomer is incorporated into an unmodified α-olefin copolymer such that the α-olefin copolymer has a desired graft modification ratio, or in which a graft-modified α-olefin having a high graft modification ratio is prelimiarily prepared and this α-olefin copolymer having a high graft modification ratio is diluted with an unmodified α-olefin copolymer to prepare a graft-modified elastomer having a desired modification ratio. In the present invention, a graft-modified elastomer prepared by any one of the above methods may be used. The graft-modified elastomer (b) used in the present invention is a copolymer having a graft modification ratio in the range of preferably 0.01 to 5% by weight, more preferably 0.1 to 4% by weight.

The above reaction is carried out preferably in the presence of a radical initiator in order to effectively carry out the graft copolymerization with the above graft monomer. The graft reaction is generally carried out at a temperature between 60° C. and 350° C. The amount of the radical initiator for use is generally in the range of 0.001 to 5 parts by weight per 100 parts by weight of the unmodified α-olefin elastomeric copolymer.

As the radical initiator, organic peroxides and organic peresters can be preferably used. Specific examples of these radical initiators are benzoyl peroxide, dichlorobenzoyl peroxide, dicumyl peroxide, di-tert-butyl peroxide, 2,5-dimethyl-2,5-di(peroxidebenzoate)-hexyne-3, 1,4-bis(tert-butylperoxyisopropyl)benzene, lauroyl peroxide, tertbutyl peracetate, 2,5-dimethyl-2,5-di(tert-butylperoxy)hexyne-3, 2,5-dimethyl-2,5-di(tert-butyloxy)hexane, tert-butyl perbenzoate, tert-butylperphenyl acetate, tert-butyl perisobutylate, tert-butyl per-sec-octoate, tert-butyl perpivalate, cumyl perpivalate, and tert-butyl perdiethylacetate. In the present invention, further, an azo compound may be used as a radical initiator. Specific examples of the azo compound are azobisisobutyronitrile and dimethylazoisobutyrate.

Of these, preferred as the radical initiator are dialkyl peroxides such as benzoyl peroxide, dicumyl peroxide, di-tert-butyl peroxide, 2,5-dimethyl-2,5-di(tert-butyl-peroxy)hexyne-3, 2,5-dimethyl-2,5-di(tert-butylperoxy)hexane and 1,4-bis(tert-butylperoxyisopropyl)benzene.

As the graft-modified elastomer (b) used in the present invention, the above graft-modified ethylene.α-olefin copolymer (i) and the above graft-modified propylene.α-olefin copolymer (ii) are generally used alone or in combination. However, other polymer, copolymer or graft copolymer may be used in combination in such an amount that does not impair the properties of the graft-modified elastomer.

Examples of the above "other polymer or copolymer" in the present invention are aromatic vinyl-containing hydrocarbon.conjugated diene copolymers or hydrides thereof. Specific examples of the aromatic vinyl-containing hydrocarbon.conjugated diene copolymers or the hydrides thereof are styrene.butadiene copolymer rubber, styrene.butadiene.styrene copolymer rubber, styrene.isoprene block copolymer rubber, styrene.isoprene.styrene block copolymer rubber, hydrogenated styrene.butadiene.styrene block copolymer rubber and hydrogenated styrene.isoprene.styrene block copolymer rubber.

The above graft-modified elastomer (b) is incorporated in an amount in the range of 1 to 50 parts by weight per 100 parts by weight of the total amount of the component (a), the component (b) and the component (c). It is particularly preferred to adjust this amount to the range of 10 to 30 parts by weight.

When the component (b) in the above amount is incorporated, there can be obtained a resin composition which is improved in mechanical properties such as impact strength without impairing excellent properties of the cycloolefin-based polymer (a).

The polyolefin resin composition of the present invention contains, as a component (c), a compound having one amino group in the molecule. The concept of "compound" used here includes a condensate, a ring-opening reaction product and a high-molecular-weight compound.

In the present invention, the following compounds are suitably usable as a component (c).

(C1) a condensate having one amino group in the molecule.

(C2) a ring-opening reaction product having one amino group in the molecule.

(C3) a polymer in which one amino group is bonded to a polyolefin having a molecular weight of not less than 20,000.

(C4) a low-molecular-weight amino compound in which one of the molecule terminals is an amino group.

That is, the condensate (C1) used as a component (c) in the present invention is a product formed by a condensation reaction, and refers mainly to an oligomer or polymer of an aminocarboxylic acid. The ring-opening reaction product (C2) is a product formed by a ring-opening reaction and refers mainly to a ring-opening polymerization polymer from lactams. Further, the polymer (C3) is a polymer in which one amino group is bonded to a polyolefin having a molecular weight of not less than 20,000. The low-molecular-weight amino compound (C4) having one amino group in the molecule refers mainly to a monomer used for the preparation of the above condensate (C1) or the above ring-opening reaction product (C2).

In the present invention, as a component (c), the component (C1), the component (C2), the component (C3) and the component (C4) may be used alone or as a mixture of at least two of these.

In the present invention, as a compound which is particularly effective as the low-molecular-weight amino compound (C-4) in which one of the molecule terminals is an amino group, used as a component (c), there is a compound of the following formula (C4a) or (C4b).

$$H_2N-R^{23}-COOH \quad \text{(C4a)}$$

(C4b)

In the above formulae (C4a) and (C4b), $R^{23}$ is an alkylene group.

Specific examples of the above low-molecular-weight amino compound are ε-aminocaproic acid, 7-aminoheptanoic acid, ω-aminoundecanoic acid, laurolactam, ω-aminononanoic acid, β-propiolactam, 2-piperidone, γ-butyrolactam, 11-aminoundecanoic acid, α-pyrropydone, γ-aminobutyric acid, β-alanine, 8-aminovaleric acid, and ε-aminolactam.

Examples of the amino group-containing condensate (C1) or the ring-opening reaction product (C2) are preferably compounds or ring-opening polymerization polymers (or polycondensation polymers) formed by condensation reactions of compounds containing an amino group and a carboxyl group, which can have (or have) an amino group and a carboxyl group, such as an aminocarboxylic acid, or a dicarboxylic acid with a diamine, or ε-aminocaprolactam, or functional derivatives thereof.

Typical examples of the amino group-containing condensate (C1) are polyamide precursors and polyamide resins. Examples of the polyamide precursors are aliphatic amines such as ethylenediamine, propylenediamine, hexamethylenediamine, diethylenetriamine, triethylenetetramine, tetraethylenepentamine, iminobispropylamine, bis(hexamethylene)triamine, 1,3,6-trisaminomethylhexane, trimethylhexamethylenediamine, bispropylenediamine, and diethylaminopropylamine;

alicyclic amines such as menthenediamine, isophoronediamine, bis(4-amino-3-methylcyclohexyl)methane, N-aminoethylpiperazine, and 1,3-diaminocyclohexane;

aliphatic aromatic amines such as m-xylylenediamine;

aromatic amines such as o-, m- or p-phenylenediamine, diaminodiphenylmethane, diaminodiphenylsulfone, 2,4-diaminoanisole, 2,4-toluenediamine, 2,4-diaminidiphenylamine, 4,4'-methylenedianiline, and diaminodixylylsulfone;

oligomers formed by polycondensation of diamine components such as bisspiro-cyclized diamines, e.g., 3,9-bis(3-aminopropyl)-2,4,8,10-tetraspiro[5,5]undecane with dicarboxylic acids such as adipic acid, sebacic acid, terephthalic acid, isophthalic acid, dodecanoic diacid, and glutaric acid; and oligomers formed by ring-opening polymerization or polycondensation of ε-caprolactam, aminocaproic acid, enantholactam, 7-aminoheptanoic acid, and 11-aminoundecanoic acid.

In the present invention, the "oligomer" refers to the above condensate or ring-opening polymerization product having a molecular weight of less than 2,000.

Examples of the polyamide resins are those which are condensates of the above diamine components and either the above dicarboxylic acid components or ε-aminoundecanoic acid and ring-opening polymerization polymers of the above lactams and have a molecular weight of not less than 2,000. Specific examples thereof are nylon-2, nylon-3, nylon-4, nylon-5, nylon-6, nylon-7, nylon-8, nylon-9, nylon-10, nylon-11, nylon-12, nylon-13, nylon-66, nylon-610, nylon-612, copolymer nylon formed from caprolactam and a nylon salt aqueous solution, nylon MXD6 formed from m-xylylenediamine and adipic acid, nylon-46, and methoxymethylated polyamide.

In the present invention, the above oligomers and polyamides may be used alone or in combination.

Of these, preferred are polyamide resins which have an amino group on one terminal and are crystalline, such as nylon 6, nylon 11 and nylon 12.

The polymer (C3) in which one amino group is bonded to a polyolefin having a molecular weight of not less than 20,000 refers, for example, to a polymer in which one amino group is bonded to a polymer of an α-olefin such as ethylene or propylene. Such a polymer (C3) can be prepared by introducing an amino group to a polyolefin according to a known method.

The above compound (c) having an amino group is incorporated in an amount of 0.01 to 45 parts by weight per 100 parts by weight of the total amount of the component (a), the component (b) and the component (c). It is particularly preferred to adjust this amount to the range of 0.01 to 30 parts by weight.

Owing to the incorporation of the compound (c) having an amino group, there can be formed a molded article which is excellent particularly in impact strength and gloss. That is, these components (C1), (C2) and (C3) has relatively high crystallinity around room temperature, and due to this crystallinity, the cycloolefin-based resin is improved in properties. The component (C4) in the composition also works in the same way as the components (C1), (C2) and (C3). It is considered that when by incorporation of this compound (c) having an amino group, the compound (c) exhibits a reinforcing effect since its crystal has an effect similar to that of a crosslinking agent at a temperature not higher than the melting point of this compound to form a crosslinked structure-like structure in the graft-modified copolymer, and that the composition exhibits excellent moldability since with an increase in temperature, the reinforcing effect due to the structure similar to a crosslinked structure decreases and the composition gradually has excellent flowability.

In addition to the above components, the polyolefin resin composition of the present invention may contain additives such as an inorganic filler, an organic filler, a thermal stabilizer, a weathering stabilizer, an antistatic agent, an anti-slipping agent, an antiblocking agent, an anti-fogging agent, a lubricant, a pigment, a dye, natural oil, synthetic oil, wax, etc.

The polyolefin resin composition of the present invention can be produced, for example, by a method in which the cycloolefin-based polymer (a) and the graft-modified elastomer (b) are separately prepared, a mixture of these cycloolefin-based polymer and graft-modified elastomer (b) are melt-kneaded, further, the compound (c) having an amino group is incorporated into the kneaded mixture and further kneaded; by a method in which the cycloolefin-based polymer (a), the graft-modified elastomer (b) and the compound (c) having an amino group are melt-kneaded at one lot; and particularly by a method in which the graft-modified elastomer (b) and the compound (c) having an amino group are melt-kneaded, the resultant kneaded mixture is incorporated into the cycloolefin-based polymer (a) and further kneaded.

The above polyolefin resin composition containing the cycloolefin-based polymer (a), the graft-modified elastomer (b) and the compound (c) having an amino group, provided by the present invention, has a softening temperature (TMA), measured with a thermal mechanical analyzer, of generally between 50° C. and 200° C., preferably between 100° C. and 180° C.

The polyolefin resin composition of the present invention can be used not only in fields where ordinary polyolefins are used but also in fields where, for example, filler-reinforced PP, ABS resin and modified polyphenylene oxide are used and mechanical strength is particularly required.

The polyolefin resin composition of the present invention has a structure in which the graft-modified elastomer (b) is dispersed in the cycloolefin-based polymer (a). And it is considered that due to the incorporation of the compound (c) having an amino group, a structure similar to a crosslinked structure is formed in the interior of the graft-modified elastomer (b). A molded article formed of such a polyolefin resin composition has excellent impact strength. In particular, due to the use of the compound having an amino group in the molecule, the contribution of the structure similar to a crosslinked structure decreases when the polyolefin resin composition is melted. As a result, such a polyolefin resin composition exhibits excellent flowability, and moreover, a molded article therefrom has excellent impact strength and gloss.

The present invention will be described below by reference to Examples. However, Examples shall not be construed as limitations to the present invention.

EVALUATION METHOD

Cycloolefin-based polymers, graft-modified elastomers and compounds having an amino group, used in the present invention, and polyolefin resin compositions of the present invention were measured for their properties as follows.

INTRINSIC VISCOSITY [$\eta$]

Measured in decalin at 135° C.

SOFTENING TEMPERATURE (TMA)

A temperature at which a needle having a diameter of 1 mm and a flat end penetrates 100 $\mu$m deep at a temperature elevation rate of 5° C./minute under a load of 50 g was taken as a TMA.

CONTENT OF GRAFT MONOMER IN GRAFT-MODIFIED ELASTOMER

Measured by $^{13}$C-NMR.

CRYSTALLINITY

Measured at 23° C. by an X-ray diffraction method.

TENSILE MODULUS

A press-formed test piece having a thickness of 2 mm was measured at 23° C. according to ASTM D638.

IZ IMPACT STRENGTH

A notched, injection-molded test piece having a thickness of ⅛ inch was measured at 23° C. according to ASTM D256.

INITIAL FLEXURAL MODULUS (FM)

An injection-molded test piece having a thickness of ⅛ inch was measured at a cross head speed of 20 mm/minute at 23° C. according to ASTM D790.

FLEXURAL STRESS AT YIELD POINT (FS)

Measured in the same manner as in the measurement for FM according to ASTM D790.

GLOSS

An injection-molded plate having a thickness of 2 mm was measured at an incident angle of 60 degrees at 23° C. according to ASTM D523.

MELT INDEX (MI)

Measured at 260° C. under a load of 2.16 kg according to JIS-K-6760.

PREPARATION EXAMPLE 1

Preparation of cycloolefin copolymer (a)

A copolymerization reaction of ethylene and tetracyclo[4.4.0.1$^{2,5}$.1$^{7,10}$]dodecene-3 (to be sometimes abbreviated as "TCD-3" hereinafter) was continuously carried out with a one-liter polymerizer having a stirring vane. That is, the polymerizer was continuously fed, from its top, with a cyclohexane solution of TCD-3 at a rate of 0.4 lit./hour such that the concentration of TCD-3 in the polymerizer was 60 g/lit, a cyclohexane solution of VO(OC$_2$H$_5$)Cl$_2$ at a rate of 0.5 lit./hour such that the concentration of vanadium in the polymerizer was 0.5 mmol/lit. (in this case the concentration of vanadium being fed was 2.86 times that of vanadium in the polymerizer), a cyclohexane solution of ethylaluminum sesquichloride [Al(C$_2$H$_5$)$_{1.5}$Cl$_{1.5}$] at a rate of 0.4 lit./hour such that the concentration of aluminum in the polymerizer was 4.0 mmol/l, and cyclohexane at a rate of 0.7 lit./hour, while polymerization reaction liquid was continuously withdrawn from the bottom of the polymerizer such that the amount of polymerization liquid in the polymerizer was constantly 1 lit. (that is, the residence time was 0.5 hour).

Further, the reaction system was also fed with 30 lit./hour of ethylene, 10 lit./hour of nitrogen and 0.3 lit./hour of hydrogen through a bubbling tube.

The copolymerization was carried out at 10° C. with circulating a cooling medium through a jacket externally provided to the polymerizer.

An ethylene TCD-3 random copolymer was prepared by carrying out the copolymerization reaction under the above conditions.

That is, polymerization liquid was withdrawn from the bottom of the polymerizer, and a cyclohexane/isopropyl alcohol mixed liquid (volume ratio=1/1) was added thereto to terminate the polymerization reaction. Then, an aqueous solution prepared by adding 5 ml of concentrated hydrochloric acid to 1 lit. of water and the above polymerization solution in a proportion of 1:1 were brought into contact by stirring them vigorously with a homomixer thereby to transfer a catalyst residue to a water phase.

The above mixture was allowed to stand, and the water phase was removed. Then, the remainder was further washed with distilled water twice, and purified and separated.

The resultant polymerization liquid was brought into contact, with vigorously stirring, with acetone of which the amount was three times that of the polymerization liquid, and a solid portion precipitated was recovered by filtration, and fully washed with acetone. Thereafter, the recovered solid was dried under a nitrogen current at 130° C. at 350 mmHg for 24 hours. The above procedure was continuously carried out to prepare an ethylene.TCD-3 random copolymer at a rate of 76 g(38 g/lit)/hour.

The above copolymer had an ethylene content, determined on the basis of the result of measurement by $^{13}$C-NMR analysis, of 70 mol %. Further, this copolymer was measured for an intrinsic viscosity [$\eta$] in decalin at 135° C. to show 0.61 dl/g, and it had an iodine value of 1.0 and TMA of 115° C.

This cycloolefin random copolymer (a) is referred to as "PO-1" hereinafter.

PREPARATION EXAMPLE 2

Polymerization example of cycloolefin copolymer (a)

Preparation Example 1 was repeated except that the polymerizer was fed with ethylene at a rate of 20 lit./hour and hydrogen at a rate of 0.5 lit./hour, to prepare an ethylene.TCD-3 copolymer.

The above copolymer had an ethylene content, determined on the basis of the result of measurement by $^{13}$C-NMR analysis, of 63 mol %. Further, this copolymer was measured for an intrinsic viscosity $[\eta]$ in decalin at 135° C. to show 0.5 dl/g, and it had an iodine value of 1.0 and TMA of 150° C.

This cycloolefin random copolymer (a) is referred to as "PO-2" hereinafter.

PREPARATION EXAMPLE 3

Preparation example of cycloolefin copolymer (a)

Preparation Example 1 was repeated except that the polymerizer was fed with ethylene at a rate of 20 lit./hour and hydrogen at a rate of 0.3 lit./hour, to prepare an ethylene.TCD-3 copolymer.

The above copolymer had an ethylene content, determined on the basis of the result of measurement by $^{13}$C-NMR analysis, of 63 mol %. Further, this copolymer was measured for an intrinsic viscosity $[\eta]$ in decalin at 135° C. to show 0.6 dl/g, and it had an iodine value of 1.0 and TMA of 150° C.

This cycloolefin random copolymer (a) is referred to as "PO-3" hereinafter.

PREPARATION EXAMPLE 4

Preparation example of cycloolefin copolymer (a)

Preparation Example 1 was repeated except that the polymerizer was fed with ethylene at a rate of 10 lit./hour and hydrogen at a rate of 0.3 lit./hour, to prepare an ethylene.TCD-3 copolymer.

The above copolymer had an ethylene content, determined on the basis of the result of measurement by $^{13}$C-NMR analysis, of 56 mol %. Further, this copolymer was measured for an intrinsic viscosity $[\eta]$ in decalin at 135° C. to show 0.8 dl/g, and it had an iodine value of 1.0 and TMA of 170° C.

This cycloolefin random copolymer (a) is referred to as "PO-4" hereinafter.

PREPARATION EXAMPLE 5

Preparation example of graft-modified elastomer (b)

One part by weight of maleic anhydride and 0.2 part by weight of 2,5-dimethyl-2,5-di(t-butylperoxy)hexyne-3 were mixed with 100 parts by weight of an ethylene propylene copolymer having an ethylene content of 80 mol % and an intrinsic viscosity $[\eta]$, measured in decalin at 130° C., of 2.2 dl/g (this copolymer will be referred to as "MP-0" hereinafter), and the resultant mixture was melt-kneaded at 260° C. with a twin-screw extruder equipped with a vent having a diameter of 30 mm to give a graft-modified elastomer (b).

The above-obtained graft-modified elastomer had a maleic anhydride graft amount of 0.90% by weight and a tensile modulus of 80 kg/cm$^2$.

The above graft-modified elastomer (b) is referred to as "MP-1" hereinafter.

PREPARATION EXAMPLE 6

Preparation example of graft-modified elastomer (b)

Preparation Example 5 was repeated except that the maleic anhydride was replaced with 1 part by weight, per 100 parts by weight of "MP-0", of glycidyl methacrylate and that this glycidyl methacrylate was mixed with 0.2 part by weight of 2,5-dimethyl-2,5-di(t-butylperoxy)-hexyne-3 to give a graft-modified elastomer (b).

The above-obtained graft-modified elastomer had a glycidyl methacrylate graft amount of 0.90% by weight and a tensile modulus of 80 kg/cm$^2$.

The above graft-modified elastomer (b) is referred to as "MP-2" hereinafter.

PREPARATION EXAMPLE 7

Preparation example of graft-modified elastomer (b)

1 Part by weight of maleic anhydride and 0.2 part by weight of 2,5-dimethyl-2,5-di(t-butylperoxy)hexyne-3 were mixed with 100 parts by weight of an ethylene propylene copolymer having an ethylene content of 80 mol % and an intrinsic viscosity $[\eta]$, measured in decalin at 130° C., of 1.4 dl/g, and the resultant mixture was melt-kneaded at 260° C. with a twin-screw extruder equipped with a vent having a diameter of 30 mm to give a graft-modified elastomer (b).

The above-obtained graft-modified elastomer had a maleic anhydride graft amount of 0.98% by weight and a tensile modulus of 80 kg/cm$^2$.

The above graft-modified elastomer (b) is referred to as "MP-3" hereinafter.

PREPARATION EXAMPLE 8

Preparation example of a compound (c) having an amino group

Vacuum-dried ε-aminocaproic acid (to be referred to as PA-0 hereinafter) was kept at 170° C. under reduced pressure for 14 hours to give a polymer of PA-0. This polymer had an intrinsic viscosity $[\eta]$, measured in sulfuric acid at 25° C., of 0.4 dl/g.

The above compound having an amino group is referred to as "PA-1" hereinafter.

EXAMPLE 1

10 Parts by weight of the graft-modified elastomer (MP-1) obtained in Preparation Example 5 and 5 parts by weight of nylon-6 (trade name: Amilan CM1007, supplied by Toray Industries, Inc) as a compound having an amino group were melt-kneaded at 250° C. with a twin-screw extruder equipped with a vent having a diameter of 30 mm to prepare a precursor compound. This precursor substance and 85 parts by weight of the cycloolefin random copolymer (PO-1) obtained in Preparation Example 1 were kneaded with the above extruder at 230° C. to give a polyolefin resin composition.

The resultant resin composition was dried at 100° C. for 8 hours, and then test pieces and square bars for the measurements of physical properties were prepared therefrom with an injection molding machine (30 EPN, supplied by Toshiba IS) at 250° C. at a mold temperature of 70° C.

Table 1 shows the physical properties of the test pieces.

As is clear from the results shown in Table 1, the above-obtained composition was excellent in impact strength, rigidity, heat resistance, gloss and flowability.

COMPARATIVE EXAMPLE 1

Example 1 was repeated except that 15 parts by weight of the graft-modified elastomer (MP-1) obtained in Preparation Example 5 and 85 parts by weight of the cycloolefin random copolymer (PO-1) obtained in Preparation Example 1 were melt-kneaded with a twin-screw extruder equipped with a vent having a diameter of 30 mm at 230° C. without using Amilan CM1007 to give a polyolefin resin composition. Test pieces and square bars were prepared from this resin composition in the same manner as in Example 1, and evaluated on physical properties.

Table 1 shows the physical properties of the test pieces.

As is clear from the results shown in Table 1, this composition showed excellent flowability, and the test pieces formed from this composition were excellent in rigidity and heat resistance. However, the impact strength thereof was low.

EXAMPLE 2

85 Parts by weight of the cycloolefin copolymer (PO-1) obtained in Preparation Example 1, 10 parts by weight of the graft-modified elastomer (MP-1) and 5 parts of a compound having an amino group (CM1007) were melt-kneaded with the above extruder in the same manner as in Example 1 without preparing a precursor mixture to obtain a polyolefin resin composition. Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

EXAMPLE 3

Example 1 was repeated except that the graft-modified elastomer was changed to MP-2 to prepare a polyolefin resin composition. Test pieces and square bars were prepared from this resin composition in the same manner as in Example 1, and evaluated on their properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

COMPARATIVE EXAMPLE 2

Example 1 was repeated except that 15 parts by weight of the graft-modified elastomer (MP-2) and 85 parts by weight of the cycloolefin random copolymer (PO-1) were melt-kneaded with a twin-screw extruder equipped with a vent having a diameter of 30 mm at 230° C. without using CM1007 to give a polyolefin resin composition. Test pieces and square bars were prepared from this resin composition in the same manner as in Example 1 and evaluated on their physical properties.

Table 1 shows the physical properties of the test pieces.

As is clear from the results shown in Table 1, this composition showed excellent flowability, and the test pieces formed from this composition were excellent in rigidity and heat resistance. However, the impact strength thereof was low.

EXAMPLE 4

Example 1 was repeated except that the graft-modified elastomer was replaced with MP-3 to prepare a polyolefin resin composition. Test pieces and square bars were prepared from this resin composition in the same manner as in Example 1, and evaluated on their properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

COMPARATIVE EXAMPLE 3

15 Parts by weight of the graft-modified elastomer (MP-3) and 85 parts by weight of the cycloolefin random copolymer (PO-1) were melt-kneaded at 230° C. with an twin-screw extruder equipped with a vent having a diameter of 30 mm in the same manner as in Example 1 without using CM1007 to obtain a polyolefin resin composition. Test pieces and square bars were prepared from this resin composition in the same manner as in Example 1, and evaluated on their physical properties.

Table 1 shows the physical properties of the above-obtained test pieces.

As is clear from the results shown in Table 1, the above composition was excellent in flowability and the test pieces formed from this composition were excellent in rigidity and heat resistance. However, their impact strength was low.

EXAMPLE 5

14 Parts by weight of the graft-modified elastomer (MP-1) obtained in Preparation Example 5 and 1 part by weight of "PA-1" as a compound having an amino group were melt-kneaded at 250° C. with a twin screw extruder equipped with a vent having a diameter of 30 mm to prepare a precursor mixture. This precursor substance and 85 parts by weight of the cycloolefin random copolymer (PO-1) obtained in Preparation Example 1 were melt-kneaded with the above extruder to give a polyolefin resin composition.

Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

EXAMPLE 6

12 Parts by weight of the graft-modified elastomer (MP-1) obtained in Preparation Example 5 and 3 parts by weight of "PA-1" obtained in Preparation Example 8 as a compound having an amino group were melt-kneaded at 250° C. with a twin-screw extruder equipped with a vent having a diameter of 30 mm to prepare a precursor mixture. This precursor substance and 85 parts by weight of the cycloolefin random copolymer (PO-1) obtained in Preparation Example 1 were kneaded with the above extruder at 230° C. to give a polyolefin resin composition. Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

EXAMPLE 7

10 Parts by weight of the graft-modified elastomer (MP-1) obtained in Preparation Example 5 and 5 parts by weight of a compound having an amino group, Amilan (CM1007), were melt-kneaded at 250° C. with a twin-screw extruder equipped with a vent having a diameter of 30 mm to prepare a precursor mixture. This precursor substance and 85 parts by weight of the cycloolefin random copolymer (PO-2) obtained in Preparation Example 2 were kneaded with the above extruder at 230° C. to give a polyolefin resin composition.

Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

COMPARATIVE EXAMPLE 4

15 Parts by weight of the graft-modified elastomer (MP-1) and 85 parts by weight of the cycloolefin random copolymer (PO-2) were melt-kneaded at 230° C. with an twin-screw extruder equipped with a vent having a diameter of 30 mm in the same manner as in Example 7 without using CM1007 to obtain a polyolefin resin composition. Test pieces and square bars were prepared from this resin composition in the same manner as in Example 1, and evaluated on their physical properties.

Table 1 shows the physical properties of the above-obtained test pieces.

As is clear from the results shown in Table 1, the above composition was excellent in flowability and the test pieces formed from this composition were excellent in rigidity and heat resistance. However, their impact strength was low.

EXAMPLE 8

10 Parts by weight of the graft-modified elastomer (MP-1) obtained in Preparation Example 5 and 10 parts by weight of a compound having an amino group, Amilan (CM1007), were melt-kneaded at 250° C. with a twin-screw extruder equipped with a vent having a diameter of 30 mm to prepare a precursor mixture. This precursor substance and 80 parts by weight of the cycloolefin random copolymer (PO-2) obtained in Preparation Example 2 were kneaded with the above extruder at 230° C. to give a polyolefin resin composition.

Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

EXAMPLE 9

12 Parts by weight of the graft-modified elastomer (MP-1) obtained in Preparation Example 5 and 3 parts by weight of a compound having an amino group (PA-1) obtained in Preparation Example 8 were melt-kneaded at 250° C. with a twin-screw extruder equipped with a vent having a diameter of 30 mm to prepare a precursor mixture. This precursor substance and 85 parts by weight of the cycloolefin random copolymer (PO-3) obtained in Preparation Example 3 were kneaded with the above extruder at 230° C. to give a polyolefin resin composition.

Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

EXAMPLE 10

10 Parts by weight of the graft-modified elastomer (MP-1) obtained in Preparation Example 5 and 5 parts by weight of a compound having an amino group, Amilan (CM1007), were melt-kneaded at 250° C. with a twin-screw extruder equipped with a vent having a diameter of 30 mm to prepare a precursor mixture. This precursor substance and 85 parts by weight of the cycloolefin random copolymer (PO-3) obtained in Preparation Example 3 were kneaded with the above extruder at 230° C. to give a polyolefin resin composition.

Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

COMPARATIVE EXAMPLE 5

15 Parts by weight of the graft-modified elastomer (MP-1) and 85 parts by weight of the cycloolefin random copolymer (PO-3) were melt-kneaded at 230° C. with an twin-screw extruder equipped with a vent having a diameter of 30 mm in the same manner as in Example 10 without using CM1007 to obtain a polyolefin resin composition. Test pieces and square bars were prepared from this resin composition in the same manner as in Example 1, and evaluated on their physical properties.

Table 1 shows the physical properties of the above-obtained test pieces.

As is clear from the results shown in Table 1, the above composition was excellent in flowability and the test pieces formed from this composition were excellent in rigidity and heat resistance. However, their impact strength was low.

EXAMPLE 11

10 Parts by weight of the graft-modified elastomer (MP-1) obtained in Preparation Example 5 and 5 parts by weight of a compound having an amino group, Amilan (CM1007), were melt-kneaded at 250° C. with a twin-screw extruder equipped with a vent having a diameter of 30 mm to prepare a precursor mixture. This precursor substance and 85 parts by weight of the cycloolefin random copolymer (PO-4) obtained in Preparation Example 4 were kneaded with the above extruder at 230° C. to give a polyolefin resin composition.

Test pieces and square bars were prepared from this resin composition in the same manner as in Example 1, and evaluated on their physical properties.

Table 1 shows the physical properties of the above-obtained test pieces.

As is clear from the results shown in Table 1, the test pieces formed from this composition were excellent in impact strength, rigidity, heat resistance and gloss, and the composition was also excellent in flowability.

COMPARATIVE EXAMPLE 6

15 Parts by weight of the graft-modified elastomer (MP-1) and 85 parts by weight of the cycloolefin random copolymer (PO-4) were melt-kneaded at 230° C. with an twin-screw extruder equipped with a vent having a diameter of 30 mm in the same manner as in Example 11 without using CM1007 to obtain a polyolefin resin composition. Test pieces and square bars were prepared from this resin composition in the same manner as in Example 1, and evaluated on their physical properties.

Table 1 shows the physical properties of the above-obtained test pieces.

As is clear from the results shown in Table 1, the above composition was excellent in flowability and the test pieces formed from this composition were excellent in rigidity and heat resistance. However, their impact strength was low.

TABLE 1

| | Cycloolefin randum copolymer (a) | Graft modified elastomer (b) | Compound having amino group (c) | Resin composition (a)/(b)/(c) | IZ (kg · cm/cm) | FM (kg/cm²) | MI (g/10 min.) | Gloss (%) | TMA (°C.) |
|---|---|---|---|---|---|---|---|---|---|
| Ex. 1 | PO-1 | MP-1 | CM1007 | 85/10/5 | 53 | 22000 | 15 | 97 | 112 |
| Com. Ex. 1 | PO-1 | MP-1 | — | 85/15/0 | 6 | 21000 | 15 | 93 | 114 |
| Ex. 2 | PO-1 | MP-1 | CM1007 | 85/10/5 | 50 | 19000 | 15 | 95 | 112 |
| Ex. 3 | PO-1 | MP-2 | CM1007 | 85/10/5 | 41 | 20000 | 13 | 95 | 111 |
| Com. Ex. 2 | PO-1 | MP-2 | — | 85/15/0 | 6 | 22000 | 15 | 95 | 114 |
| Ex. 4 | PO-1 | MP-3 | CM1007 | 85/10/5 | 40 | 21000 | 15 | 95 | 111 |
| Com. Ex. 3 | PO-1 | MP-3 | — | 85/15/0 | 6 | 22500 | 16 | 97 | 113 |
| Ex. 5 | PO-1 | MP-1 | PA-0 | 85/14/1 | 52 | 21000 | 15 | 95 | 111 |
| Ex. 6 | PO-1 | MP-1 | PA-1 | 85/12/3 | 45 | 20500 | 15 | 95 | 112 |
| Ex. 7 | PO-2 | MP-1 | CM1007 | 85/10/5 | 12 | 23500 | 26 | 97 | 148 |
| Com. Ex. 4 | PO-2 | MP-1 | — | 85/15/0 | 3 | 23600 | 27 | 95 | 149 |
| Ex. 8 | PO-2 | MP-1 | CM1007 | 80/10/10 | 20 | 20000 | 27 | 97 | 145 |
| Ex. 9 | PO-3 | MP-1 | PA-1 | 85/12/3 | 14 | 23000 | 27 | 95 | 149 |
| Ex. 10 | PO-3 | MP-1 | CM1007 | 85/10/5 | 15 | 23400 | 4 | 93 | 149 |
| Com. Ex. 5 | PO-3 | MP-1 | — | 85/15/0 | 5 | 23000 | 4 | 92 | 148 |
| Ex. 11 | PO-4 | MP-1 | CM1007 | 85/10/5 | 25 | 23000 | 0.2 | 90 | 168 |
| Com. Ex. 6 | PO-4 | MP-1 | — | 85/15/0 | 6 | 23300 | 0.3 | 93 | 167 |

We claim:

1. A polyolefin resin composition comprising:
   (a) at least one cycloolefin-based polymer selected from the group consisting of
      (a1) a homopolymer derived from a cycloolefin represented by the following formula (I):

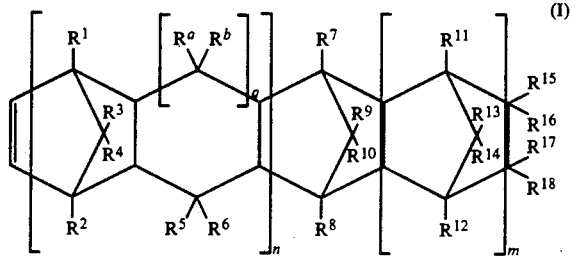

wherein n is 0 or 1, m is 0 or a positive integer, q is 0 or 1, each of $R^1$ to $R^{18}$, $R^a$ and $R^b$ is, independently of the other, an atom or a group selected from the class consisting of a hydrogen atom, a halogen atom and a hydrocarbon group, two of $R^{15}$ to $R^{18}$ may bond to each other to form a monocyclic or polycyclic group which may have a double bond, and further, a combination of $R^{15}$ and $R^{16}$ or a combination $R^{17}$ and $R^{18}$ may form an alkylidene group, (a2) a copolymer derived from said cycloolefins of said formula (I),
   (a3) a hydrogenation polymer of the homopolymer (a1) or the copolymer (a2), and
   (a4) a cycloolefin/ethylene random copolymer composed of a polymer unit derived from a cycloolefin of said formula (I) and a polymer unit of ethylene;

(b) an elastomer which is a graft-modified product of a non-crystalline or low-crystalline α-olefin copolymer formed from at least two α-olefins grafted with an unsaturated carboxylic acid or a derivative thereof, and which is dispersed in the component (a) and has a tensile modulus, at 23° C., of 0.1 to 2,000 kg/cm², and (c) a compound which has one amino group in the molecule and forms a structure similar to a crosslinked structure in the interior of the compound (b) and wherein the polyolefin resin composition contains, per 100 parts by weight of the total amount of the components (a), (b) and (c), 50 to 95 parts by weight of the component (a), 1 to 50 parts by weight of the component (b) and 0.01 to 45 parts by weight of the component (c).

2. The polyolefin resin composition of claim 1, wherein the component (a) has a softening temperature in the range between 70° C. and 200° C. and the component (a) has an intrinsic viscosity [η], measured in decalin at 130° C., in the range of 0.3 to 2.0 dl/g.

3. The polyolefin resin composition of claim 1, wherein the compound (c) having one amino group in the molecule is ε-aminocaproic acid or a condensate thereof, or nylon-6.

4. The polyolefin resin composition of claim 1, wherein the compound (c) having one amino group in the molecule is selected from the group consisting of:
   (C1) a condensate having one amino group in the molecule;

(C2) a ring-opening reaction product having one amino group in the molecule:

(C3) a polymer in which one amino group is bonded to a polyolefin having a molecular weight of not less than 20,000; and (C4) a low molecular weight amino compound in which a terminus end of the molecule is an amino group.

5. The polyolefin resin composition of claim 4 wherein the compound (c) having one amino group in the molecule is said condensate (C1).

6. The polyolefin resin composition of claim 4 wherein the compound (c) having one amino group in the molecule is said ring-opening reaction product (C2).

7. The polyolefin resin composition of claim 4 wherein the compound (c) having one amino group in the molecule is said polymer (C3).

8. The polyolefin resin composition of claim 4 wherein the compound (c) having one amino group in the molecule is said low molecular weight amino compound (C4).

9. The polyolefin resin composition of claim 4 wherein the elastomer (b) is a graft-modified ethylene-α-olefin copolymer rubber.

10. The polyolefin resin composition of claim 4 wherein the elastomer (b) is a graft-modified propylene-α-olefin copolymer rubber.

11. The polyolefin resin composition of claim 4 wherein the component (c) is present in an amount of 0.01 to 30 parts by weight.

12. The polyolefin resin composition of claim 4 wherein the components (b) and (c) are melt-kneaded with each other to form a precursor substance, and the precursor substance and component (a) are thereafter melt-kneaded to form said composition.

* * * * *